United States Patent

[11] 3,599,724

| [72] | Inventors | Harry Fraske<br>1813 Pettigrew Road;<br>Alfred Fraske, 260 Duncan Road, both of<br>Estevan, Saskatchewan, Canada |
|---|---|---|
| [21] | Appl. No. | 848,589 |
| [22] | Filed | Aug. 8, 1969 |
| [45] | Patented | Aug. 17, 1971 |
| [32] | Priority | Aug. 26, 1968 |
| [33] | | Great Britain |
| [31] | | 40765 |

[54] ROCK PICKER
8 Claims, 3 Drawing Figs.

[52] U.S. Cl. ..................................................... 171/63
[51] Int. Cl. ...................................................... A01b 43/00

[50] Field of Search............................................. 171/85, 91, 93, 95, 86, 98, 63

[56] References Cited
UNITED STATES PATENTS
2,732,672   1/1956   Fleischman ..................   171/63

*Primary Examiner*—Antonio F. Guida
*Attorney*—Kent & Ade

ABSTRACT: A pickup reel has teeth and retainers which move upwardly when an obstruction is engaged. They are positioned by outer and inner cam tracks for optimum operational positioning. The reel is positioned by hydraulic piston and cylinder assemblies which also dump the stone bucket when the lowermost position of the reel is reached and the piston and cylinder assemblies are further extended.

INVENTORS
HARRY FRASKE
BY ALFRED FRASKE

INVENTOR.
HARRY FRASKE
BY ALFRED FRASKE
AGENTS

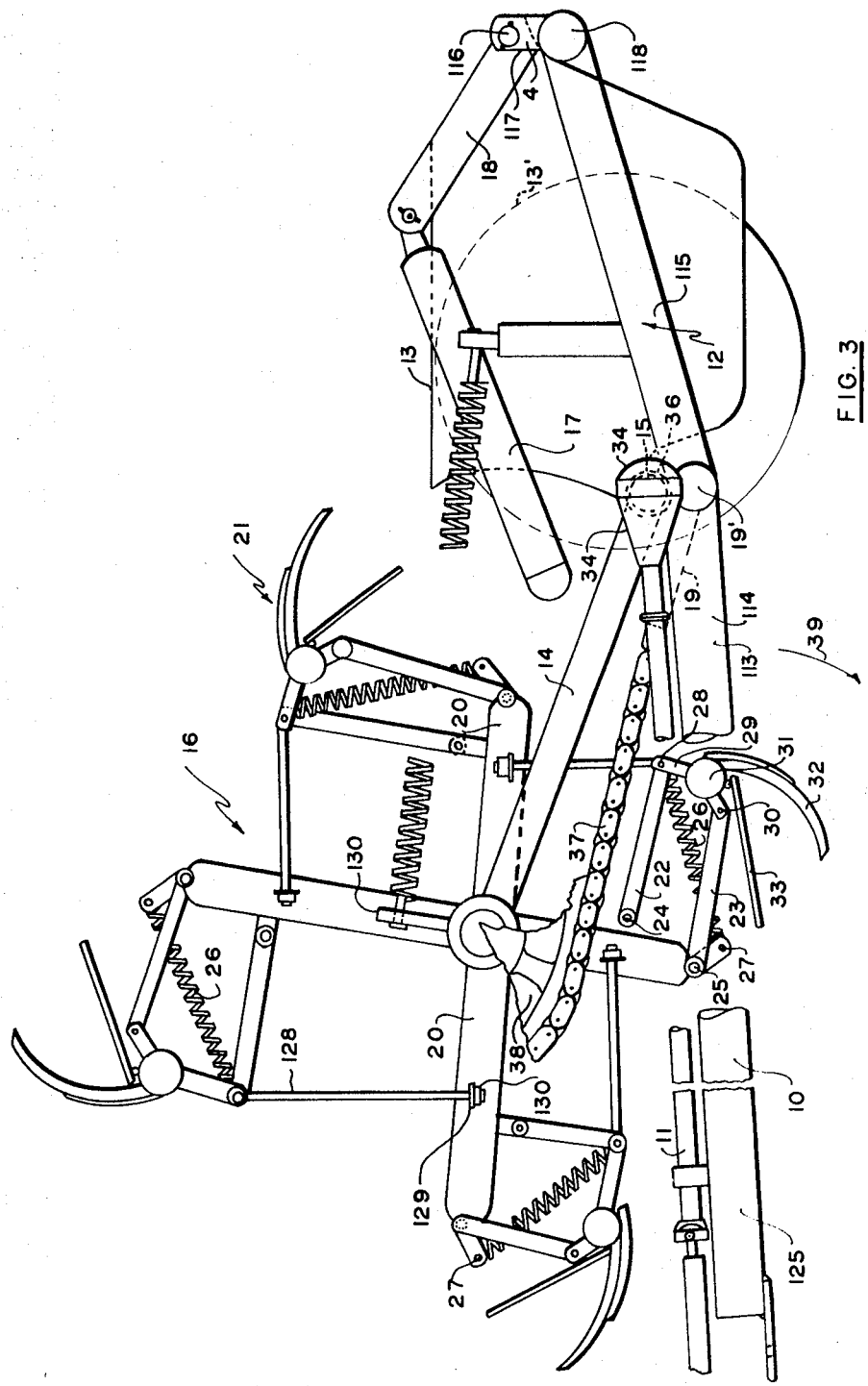

ROCK PICKER

This invention relates to new and useful improvements in stone pickers, particularly stone pickers adapted to be towed behind a towing vehicle such as a tractor or the like.

Conventional stone pickers suffer from several disadvantages. First and foremost is the fact that if the stone-picking teeth engage a relatively immovable object, they merely hinge rearwardly with the hopes that this object will be cleared due to the forward motion of the machine. They are then snapped forwardly by springs and if another stone is in the way, damage can easily occur.

We have overcome this principle disadvantage by providing linkage which enables the teeth to move substantially vertically if an obstruction is encountered and to move vertically downwardly as soon as it is cleared thus preventing this forwardly snapping action.

Secondly, conventional stone picking devices usually contain a rotating reel so that the pickup teeth engage the ground at a tangent as they revolve. This means that many stones are missed and in fact some stone pickers incorporate a reel in which the teeth are stationary for a predetermined length of time as they pass along the ground and then revolve partially so that another set of teeth comes into place. I have overcome the disadvantage of the mechanism required for this type of stone picker by providing teeth which although rotating continuously, nevertheless have a sweeping action along the ground for a considerable distance thus facilitating the picking action of the teeth.

A yet further object of the invention is to provide a device of the character herewithin described which is simple in construction, economical in manufacture, and in other words well suited to the purpose for which it is designed.

Summarizing, we have provided a rock pickup device adapted to be towed behind a tractor or the like and which includes a pivoted stone bucket at the rear and a rotatable pickup reel assembly in advance of the bucket. The reel assembly includes a plurality of pickup teeth components positioned by cam tracks engaged by cam followers secured to the components. Hydraulic piston and cylinder assemblies raise and lower the reel and the same assemblies also dump the bucket when extended beyond the lowermost limits of the reel assembly.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying FIGS. in which:

FIG. 3 is a side elevation of an alternative embodiment.

In the drawings like characters of reference indicate corresponding parts in the different figures.

Figure 1:
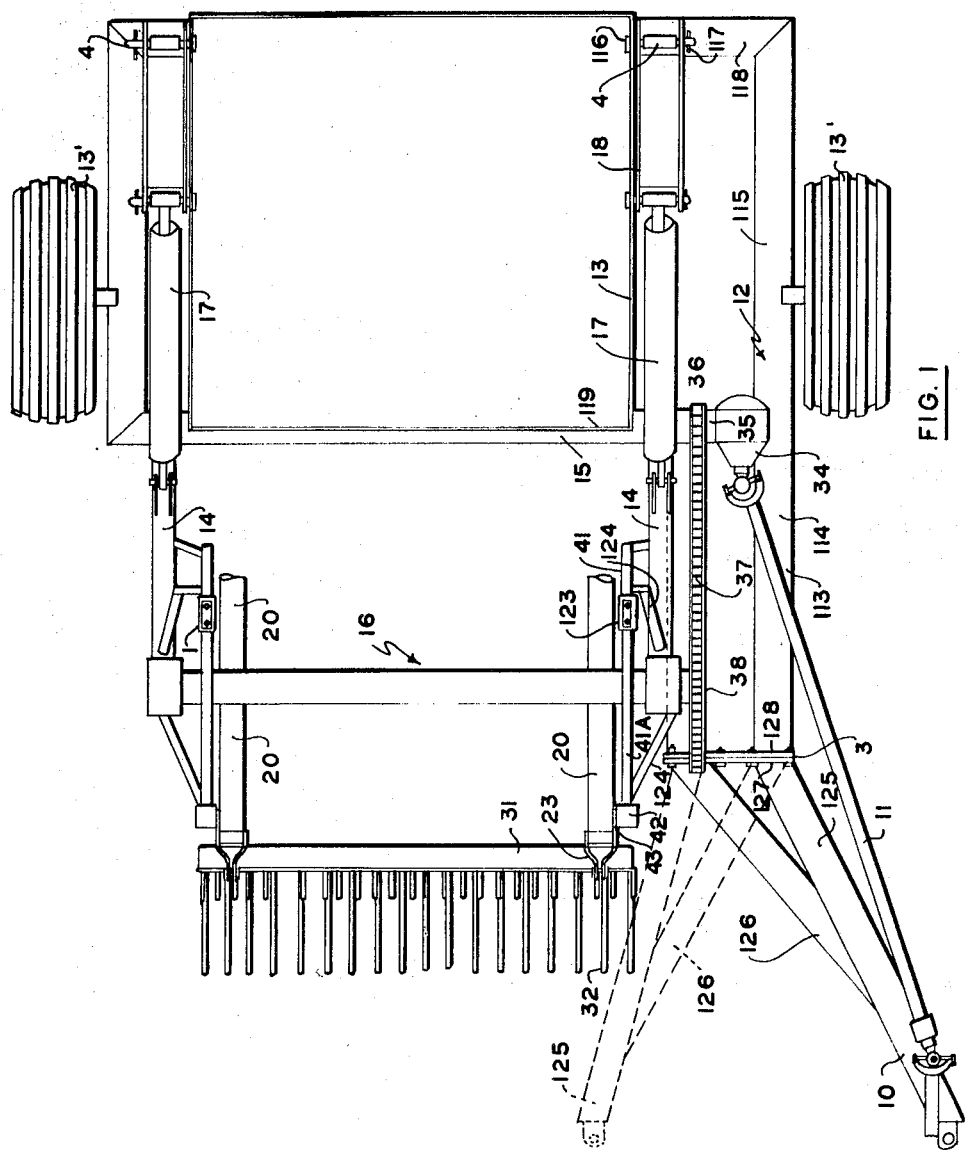
FIG. 1 is a top plan view of the preferred embodiment.

Proceeding therefore to describe the invention in detail, reference character 10 illustrates a hitch tongue by which the machine may be secured to a towing vehicle such as a tractor. In this connection the power takeoff of the tractor (not illustrated) connects to a drive shaft 11 which overlies the tongue 10 as clearly shown in FIG. 1.

This tongue 10 extends rearwardly to a rectangular framework or chassis 12 mounted upon a pair of ground-engaging wheels and axle assemblies 13' one upon each side thereof. This chassis includes a substantially horizontal forward portion 113 comprising side members 114 and transverse member 19. Extending rearwardly and upwardly from the forward portion is a stone bucket receiving portion 115. A stone bucket 13 is pivotally secured by the upper rear corners upon transverse member 118 of the stone bucket receiving portion 115. The front edge 119 of the bucket is curled or curved and rests upon transverse member 19 when in the stone receiving position as shown in the drawings.

A pair of arms 14 extend forwardly from pivot points 15 and carry the reel assembly collectively designated 16. Hydraulic piston and cylinder assemblies 17 extend between the arms 14, and links 18 which extend forwardly from pivot pins 116 in lugs 117 which extend upwardly from the rear bucket edge, and these hydraulic cylinders are connected to the source of hydraulic power on the tractor, in the usual manner.

Extension and retraction of the hydraulic piston and cylinder assemblies 17 will raise and lower the arms 14 within limits, together with the reel assembly 16.

The extension of the piston and cylinder assemblies 17 beyond a predetermined position, engages arms 14 with stops 19 extending from a transverse member 19' so that further extension of the hydraulic piston and cylinder assemblies will cause the buckets 13 to pivot rearwardly thus dumping stones therein upon the ground in a pile behind the machine.

Figure 2:
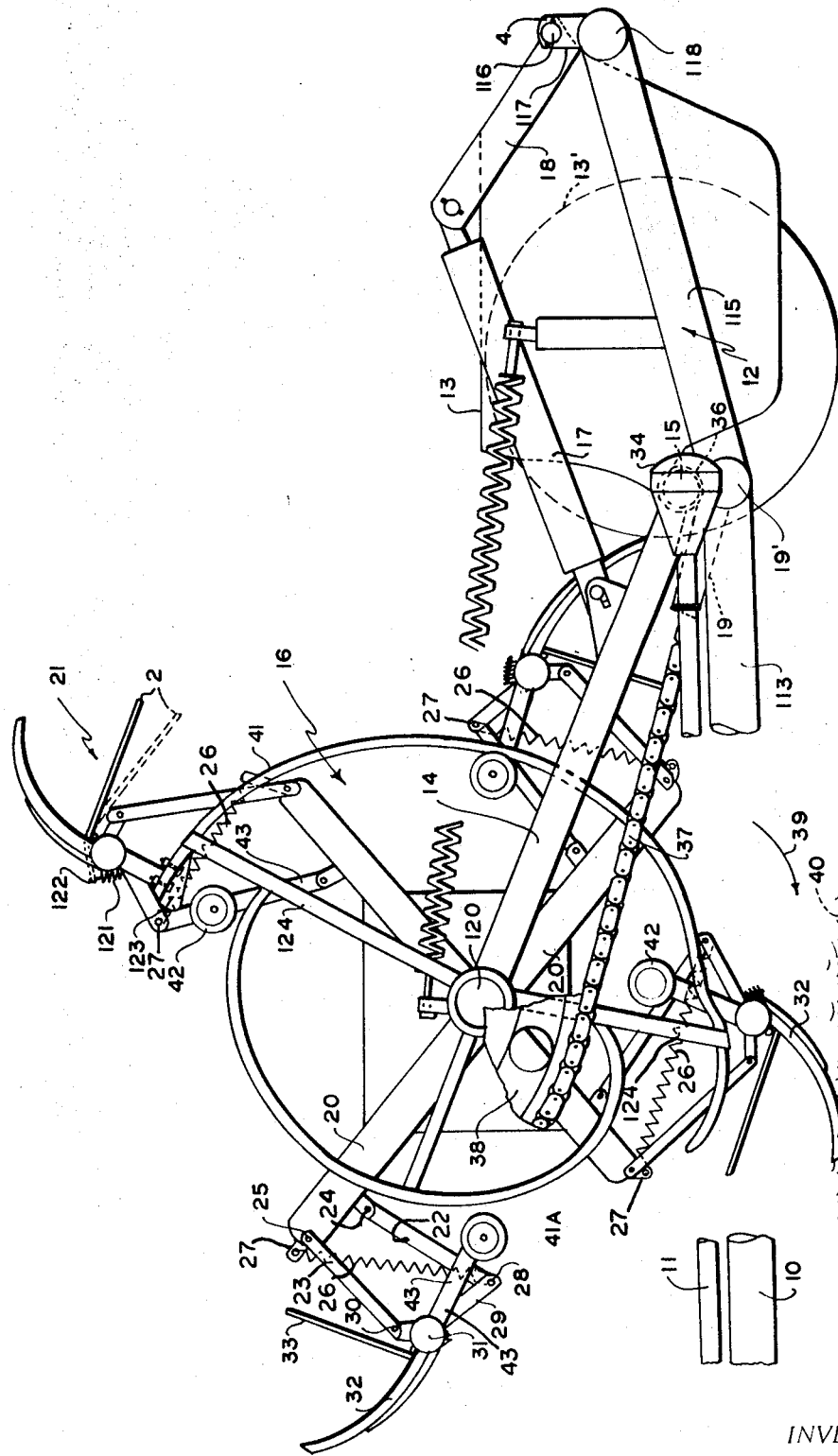
FIG. 2 is a side elevation of FIG. 1.

The reel assembly 16 shown in FIG. 2 consists of extending arms 20 secured to each end of a reel shaft 120 journaled within the ends of arms 14. In the claims I have referred to this mounting as a central axial assembly. These arms 20 are provided with pickup teeth assemblies extending transversely between the ends of the arms 20. These assemblies include first and second linkage members 22 and 23 pivoted to the arms 20 at points 24 and 25 respectively. A spring 26 extends from lug 27 at the end of the arms 20 and to pivot point 28 upon the end of arm 24. A link 29 is pivotally secured to pivot point 28 by one end thereof and to pivot point 30 at the other end thereof, which is situated on the extremity of link 23. A cross tube 31 extends between corresponding links 29 and the pickup teeth 32 extend downwardly from this tube. Retainer teeth 33 also extend from the tube 31 at an angle from teeth 32 as clearly shown in the accompanying drawings. If the teeth 32 strike an obstruction, the parallel linkage 22 and 23 causes tube 31 to rise almost vertically with respect to arms 20 and springs 26 move the teeth downwardly after the obstruction has been cleared. The retainer teeth 33 are pivoted intermediate the ends thereof to each of the teeth 32 and are normally maintained in the position shown in full line in FIG. 2 by spring 121 extending between the rear ends 122 of the teeth 33 and link 29.

If a relatively large rock or stone is engaged by the teeth 32, the retainer teeth 33 can move upwardly away from the teeth 32 against the pressure of spring 121 as shown in phantom in FIG. 2.

The aforementioned drive shaft 11 connects with right angle gear box 34 which in turn drives shaft 35 extending across the machine. Sprocket 36 is secured to shaft 35 and chain 37 extends around the sprocket and around further sprocket 38 secured to one side of the rock picking assembly 16 so that this pickup assembly is rotated in the direction of arrow 39. Rocks are picked up by the teeth assemblies 32 and moved over the top of the device so that they are dumped by gravity within the bucket 13.

It is desirable that the pickup teeth 32 sweep substantially parallel with the ground for a considerable distance during rotation thereof and FIG. 2 shows the cam track assembly which enables this to take place so that the teeth 32 are horizontal with the ground for a distance indicated by reference characters 40.

The cam tracks 41 are so shaped that cam followers 42 situated on the ends of extension members 43 from tubes 31, position the stone pickup assemblies 32 to permit this horizontal action. The cam track is provided with an outer track 41 and inner track 41A.

The cam followers 42 engage the inside surface of the outer track 41 which extends just past top dead center of the path of the reel, downwardly on the stone bucket side. The major portion of this track is curved to position the pickup assembly in a downwardly facing position in order to facilitate dumping of rocks from the assemblies into the bucket. However, the lower portion which extends just past bottom dead center of the path of the reel, maintains the teeth substantially horizontal as hereinbefore described during this part of the travel.

Upon leaving the outer tracks just past bottom dead center, the cam followers engage the outside of the inner tracks 41A which curves upwardly and rearwardly and terminates below but overlapping the entrance to the outer track 41. This inner track maintains the pickup assemblies in the upwardly facing position best suited to retain stones and rocks until they begin to pass over top dead center to the dumping position.

Rubber buffers or cushions 123 are secured to the inner surface of the outer track at the beginning thereof to facilitate a smooth transfer of the cam followers at this point, it being understood that they are relatively heavily loaded by the weight of stones and rocks in this position.

The outer and inner tracks 41 and 41A are supported by straps 124 secured to the ends of arms 14.

The hitch tongue 10 includes a major tube 124 and a brace tube 126 extending diagonally and rearwardly therefrom. These tubes terminate with an attaching flange 127 which is bolted to a mating flange 128 secured to one side of the chassis 12. It is situated in the position shown in full line in FIG. 1 for operating the rock picker but may be unbolted and reversed to the position shown in phantom in FIG. 1, for transporting the rock picker, it being understood that this position reduces the effective width of the machine considerably.

FIG. 3 shows an alternative embodiment of the pickup reel assembly 16 and corresponding reference characters are used throughout.

However, instead of the cam tracks 41 and 41A and the cam followers, we have provided rods 128 pivoted by one end thereof to the pivot point 28 and extending to a bracket 129 secured to the arm 20 trailing immediately behind. A nut 130 is secured to the end of the rod 128 after it has passed through the bracket 129 and it should be understood that this rod slides freely through this bracket. The rod 128 maintains the rock pickup assemblies in the desired position but permits them to be moved upwardly if an obstruction is engaged, against tension of spring 26.

In both embodiments the reel assembly 16 floats due to the provision of tension springs 129 extending between upstanding members 18 from the chassis 10 and lugs 130 extending upwardly from the ends of arms 14.

Various modifications can be made within the scope of the invention concept which is herein disclosed and/or claimed.

What we claim as our invention is:

1. A rock picker comprising in combination a chassis, a stone bucket in said chassis mounted for stone-receiving and stone-dumping positions, a rock-picking reel assembly journaled for rotation in said chassis in advance of said bucket, means mounting said reel assembly in said chassis, said reel assembly including a central axial member, sets of arms extending radially from each end thereof and being rotatable therewith, and a pickup assembly between the ends of corresponding arms, said pickup assembly including a transverse member situated between corresponding arms, sets of pickup teeth secured to said members, and means mounting said transverse members to said arms, said means including first and second linkage members pivotally secured by one end thereof to said arms and by the other ends thereof to a bellcrank secured to said members, and spring means operatively connected to said pickup assembly normally biasing said teeth to the rock pickup position, said linkage members causing said pickup teeth to move substantially vertically when an obstruction is engaged therewith and retainer teeth pivotally mounted intermediate the ends thereof to adjacent said members, and diverging outwardly from said pickup teeth, and spring means operatively connected to the inner ends of said retainer teeth normally mounting said retainer teeth at a predetermined distance from said pickup teeth.

2. The device according to claim 1 which includes outer and inner cam tracks situated adjacent the ends of said reel assembly and cam followers operatively connected to each of said pickup assemblies and engaging the inner surface of said outer tracks and the outer surface of said inner tracks, and resilient cushion means at the entrance of each of said outer tracks.

3. The device according to claim 1 which includes a pair of arms pivotally mounted by one end thereof to said chassis and inclining upwardly and forwardly, said reel assembly being journaled for rotation between the outer ends of said arms, and means to raise and lower said reel assembly within limits, said means including an hydraulic piston and cylinder assembly operatively extending between said bucket and said arms, means on said chassis engageable by said arms when said reel assembly is in the lowermost position, said piston and cylinder assembly rotating said bucket around the pivotal mounting thereof when said arms are engaging said stops.

4. The device according to claim 2 which includes a pair of arms pivotally mounted by one end thereof to said chassis and inclining upwardly and forwardly, said reel assembly being journaled for rotation between the outer ends of said arms, and means to raise and lower said reel assembly within limits, said means including an hydraulic piston and cylinder assembly operatively extending between said bucket and said arms, means on said chassis engageable by said arms when said reel assembly is in the lowermost position, said piston and cylinder assembly rotating said bucket around the pivotal mounting thereof when said arms are engaging said stops.

5. In a rock picker which includes a chassis, and a stone bucket in said chassis mounted for stone receiving and stone dumping positions; a reel assembly journaled for rotation in said chassis in advance of said bucket, means mounting said reel assembly in said chassis, said reel assembly including a central axial member, sets of arms extending radially from each end thereof and being rotatable therewith and pickup assemblies between the ends of corresponding arms, said pickup assemblies including a transverse member situated between corresponding arms, sets of pickup teeth secured to said members, and means mounting said transverse members to said arms, said means including first and second linkage members pivotally secured by one end thereof to said arms and by the other ends thereof to a bellcrank secured to said member and tension spring means operatively connected to said pickup assembly normally biasing said teeth to the rock pickup position, said linkage members causing said pickup teeth to move substantially vertically when an obstruction is engaged thereby and retainer teeth pivotally mounted intermediate the ends thereof to adjacent said members, and diverging outwardly from said pickup teeth, and spring means operatively connected to the inner ends of said retainer teeth normally mounting said retainer teeth at a predetermined distance from said pickup teeth.

6. The device according to claim 5 which includes outer and inner cam tracks situated adjacent the ends of said reel assembly and cam followers operatively connected to each of said pickup assemblies and engaging the inner surface of said outer tracks and the outer surface of said inner tracks, and resilient cushion means at the entrance end of each of said outer tracks.

7. The device according to claim 5 which includes a pair of arms pivotally mounted by one end thereof to said chassis and inclining upwardly and forwardly, said reel assembly being journaled for rotation between the outer ends of said arms, and means to raise and lower said reel assembly within limits, said means including an hydraulic piston and cylinder assembly operatively extending between said bucket and said arms, means on said chassis engageable by said arms when said reel assembly is in the lowermost position, said piston and cylinder assembly rotating said bucket around the pivotal mounting thereof when said arms are engaging said stops.

8. The device according to claim 6 which includes a pair of arms pivotally mounted by one end thereof to said chassis and inclining upwardly and forwardly, said reel assembly being journaled for rotation between the outer ends of said arms, and means to raise and lower said reel assembly within limits, said means including an hydraulic piston and cylinder assembly operatively extending between said bucket and said arms, means on said chassis engageable by said arms when said reel assembly is in the lowermost position, said piston and cylinder assembly rotating said bucket around the pivotal mounting thereof when said arms are engaging said stops.